United States Patent [19]

Layton

[11] 4,283,752
[45] Aug. 11, 1981

[54] TERNARY NIOBATE DIELECTRIC COMPOSITIONS

[75] Inventor: Margaret M. Layton, Big Flats, N.Y.

[73] Assignee: Corning Glass Works, Corning, N.Y.

[21] Appl. No.: 901,984

[22] Filed: May 1, 1978

[51] Int. Cl.³ .......................... H01G 4/12; H01B 3/12
[52] U.S. Cl. .................................. 361/321; 29/25.42; 106/39.5; 106/73.2
[58] Field of Search ............................ 252/63.2, 63.5; 29/25.42; 361/321, 322; 106/39.5, 73.2

[56] References Cited

U.S. PATENT DOCUMENTS

| | | | |
|---|---|---|---|
| 2,805,165 | 9/1957 | Goodman | 106/39.5 |
| 3,490,887 | 1/1970 | Merczob et al. | 65/33 |
| 3,600,652 | 8/1971 | Riley | 252/63.2 X |
| 3,635,759 | 1/1972 | Howatt | 29/25.42 X |

OTHER PUBLICATIONS

Edelman, "Some Properties of Thick Film Niobate Capacitors", Proceedings of The 1970 Electronic Components Conference, Wash, D.C. (May 13–15, 1970), pp. 40–45.

Smolenskii et al., "Ferroelectric Properties of Solid Solutions in the System $P_3Nb_2O_6$–$BaNb_2O_6$–$SrNb_2O_6$", Soviet Physics–Solid State, vol. 1, p. 400, et S22, (1959).

Subbarao et al., "Nonstoichiometry and Ferroelectric Properties of $PbNb_2O_6$-Type Compounds", J. Chem. Phys. (6), pp. 1846–1851, Jun. 1960.

Anan'Eva et al., Soviet Physics–Acoustics, vol. 10, No. 3, Jan.–Mar. 1965, pp. 227–231.

Mikhaycov et al., "Electrical Properties of Some Solid Solutions of Niobates and Tantalates of Divalent Metals", 12V Akad Nauk USSR, Ser. F12.24, pp. 1282–1284, (1970).

Primary Examiner—Harris A. Pitlick
Attorney, Agent, or Firm—Walter S. Zebrowski; Richard E. Kurtz

[57] ABSTRACT

A dielectric material which meets the temperature requirements for X7R grade capacitors consists of a fired ternary niobate composition. A dielectric constant of at least 2000 and a limited change in dielectric constant with temperature is present in compositions having the approximate formula:

$$Pb_x\cdot Ba_y\cdot Sr_z(Nb_2O_6)$$

where x, y and z represent the mole fractions of each of Pb, Ba and Sr which are in the ranges of $X=0.1$ to 0.4, $y=0.1$ to 0.4, $z=0.4$ to 0.5, the sum of x, y and z being 1. Modifications which increase these ranges include doping the ternary niobate composition with a rare earth and substitution of $Ta_2O_5$ for $Nb_2O_5$. During preparation, the composition is heated in a cycle which produces a mixture of phases, primarily rhombohedral and tetragonal structures similar to those of $PbNb_2O_6$.

28 Claims, 6 Drawing Figures

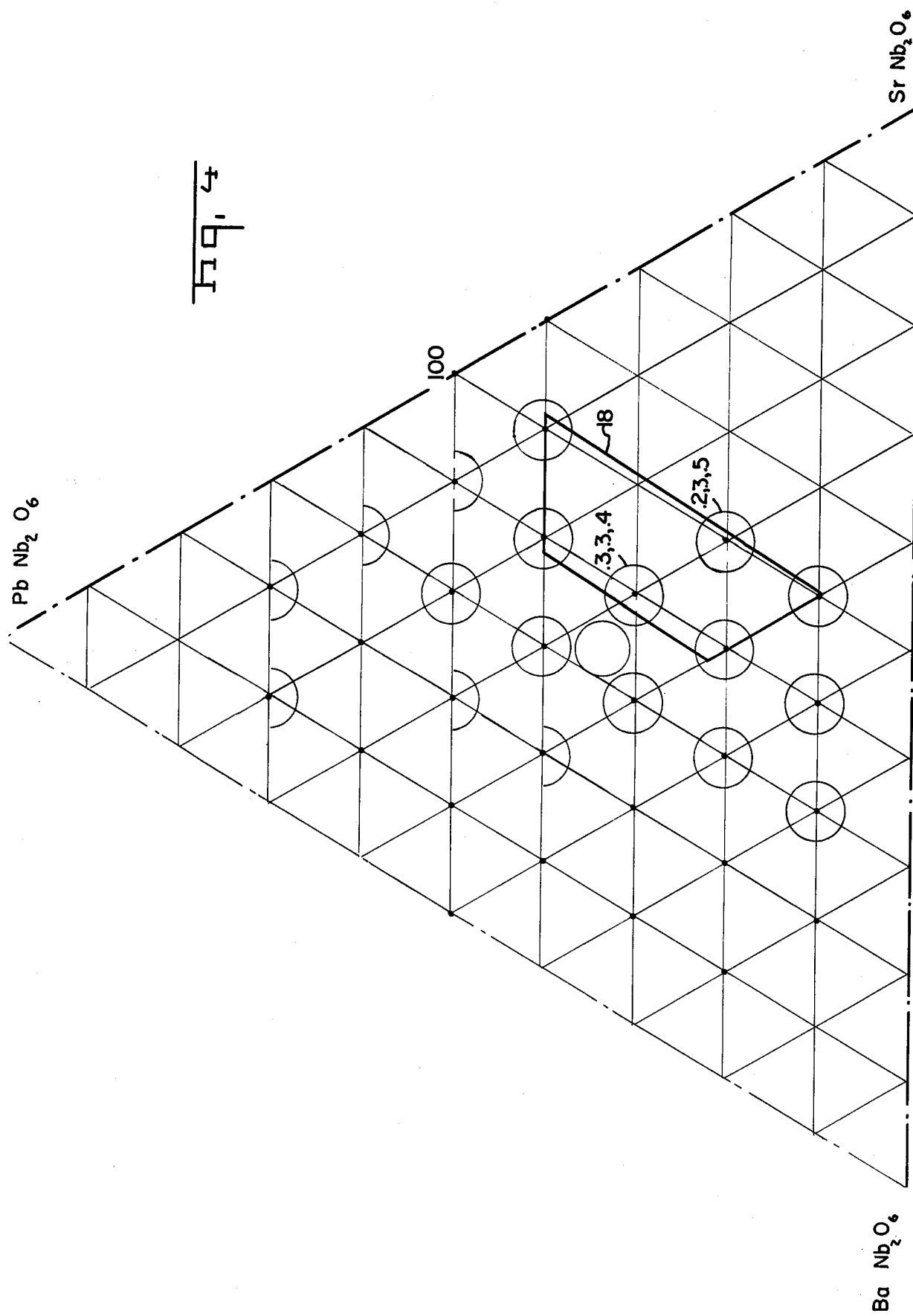

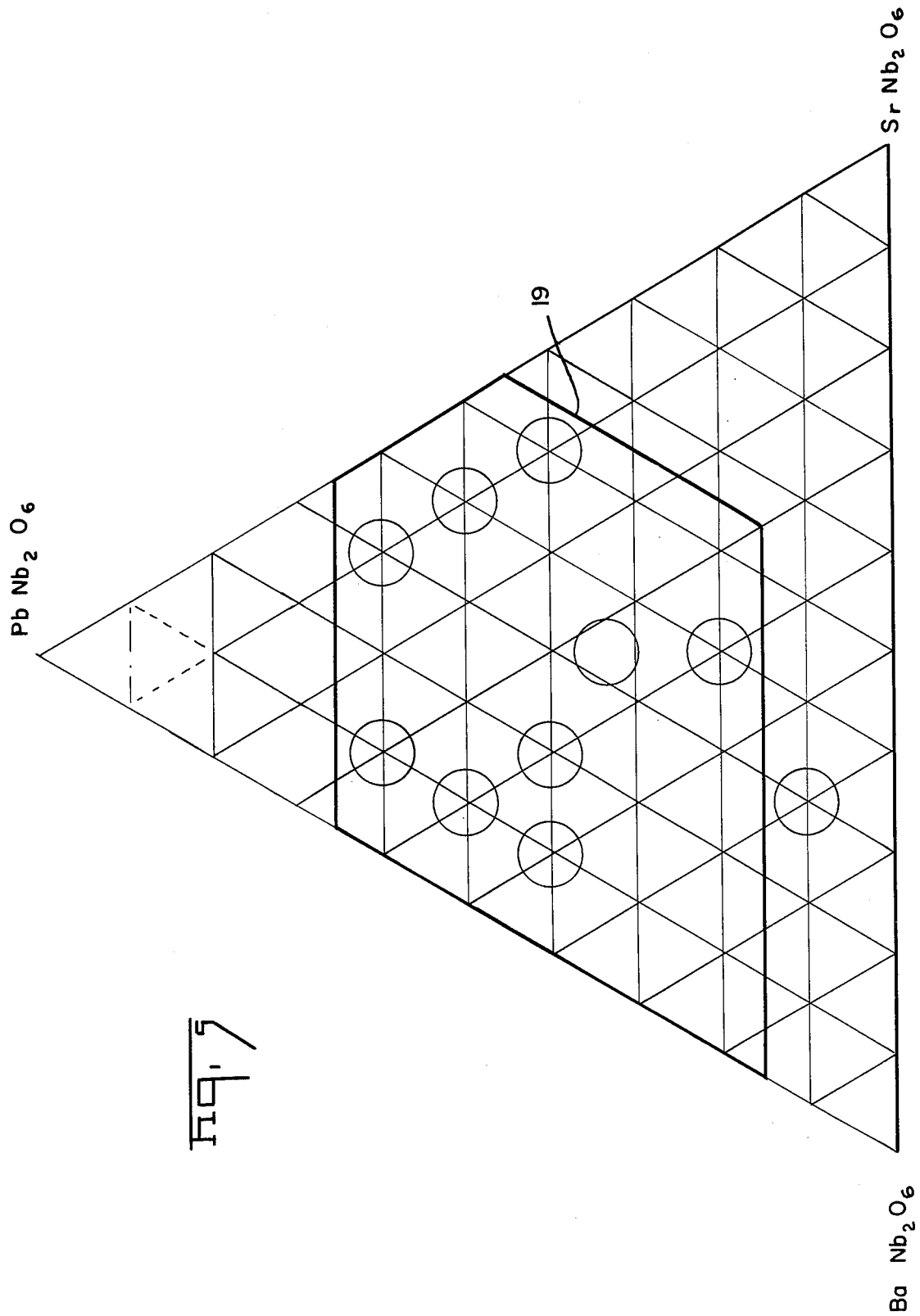

TERNARY NIOBATE DIELECTRIC COMPOSITIONS

BACKGROUND OF THE INVENTION

This invention relates to dielectric compositions and methods of making them.

Capacitors made in accordance with the teachings of U.S. Pat. Nos. 3,604,082—McBrayer et al; 3,659,990—Cato, Jr. et al and 3,988,405—Smith et al include a stack of thin sheets of dielectric material with films of conductive material applied to the sheet to form electrodes. Precious metals such as palladium, platinum or gold have been used for the electrodes. U.S. Pat. No. 3,679,950—Rutt and No. 3,772,748—Rutt describe techniques for applying electrodes of materials other than the precious metals. Compositions having high dielectric constant are advantageous for use in such capacitors. One advantage of a high dielectric constant material is that fewer dielectric layers can be used, thereby providing easier fabrication and reduced cost of electrode material which is a particular consideration when one of the precious metals is used for the electrodes.

Another requirement for capacitors is that the dielectric constant of the material vary only within specified limits with temperature. One E.I.A. (Electronics Industry Association) specification, referred to as X7R requires that the change in dielectric constant be less than ±15% over the range −55° C. to 125° C. A similar requirement is stated in the Military BX specification. The commercial Z5U and X5U specifications have less rigorous specifications.

It is an object of the present invention to provide a dielectric material which meets these requirements for use in capacitors.

Barium titanate has long been used as dielectric material in capacitors. Other crystalline compositions exhibiting ferroelectricity or anti-ferroelectricity have been investigated. These include $Cd_2Nb_2O_7$, $Pb_2Nb_2O_7$, $Sr_2Ta_2O_7$ and $PbNb_2O_6$. U.S. Pat. No. 2,805,165—Goodman describes binary and ternary lead niobate systems. In column 7, lines 38-45, Goodman refers to a binary barium containing lead metaniobate ceramic which is useful for capacitors. In lines 46-55, Goodman refers to a ternary metaniobate composition in which strontium is substituted in part for lead. In particular, Goodman finds that the compositions having $SrNb_2O_6$ between 20-60 mole percent have a high dielectric constant, and compositions containing more than 60 mole percent have a flat temperature-dielectric constant relationship. I have found that while $SrNb_2O_6$ does flatten the temperature-dielectric constant relationship, the addition of too much $SrNb_2O_6$ lowers the dielectric constant and makes it more difficult to sinter the body. Amounts less than 0.4 mole fraction do not produce a flat curve with a high dielectric constant over the temperature range specified for these capacitors. In accordance with the present invention, the limits on the amount of $SrNb_2O_6$ are about 0.4 to 0.5 mole fraction.

It is an object of the present invention to provide ternary niobate compositions in a critical mole fraction range which will meet capacitor specifications and to provide modified ternary niobate compositions which will meet these specifications in a broader range.

SUMMARY OF THE INVENTION

In accordance with this invention, fired ternary niobate compositions meet the dielectric constant and temperature characteristic requirements for capacitors. More particularly, a fired ternary niobate composition having the approximate formula $Pb_x \cdot Ba_y \cdot Sr_z (Nb_2O_6)$ meets the requirements. The limits on the mole fractions of x, y and z are: x is from 0.1–0.4, y is from 0.1–0.4 and z is 0.4–0.5.

Further, in accordance with this invention, modified ternary niobate compositions over a broader range of mole fractions than that specified above meet the requirements for capacitors. One modification includes doping the ternary niobate composition with a compound of one of the rare earths Nd, Ce or La. Another modification is substituting $Ta_2O_5$ for $Nb_2O_5$ to form the ternary composition having an approximate formula:

$$Pb_x \cdot A_y \cdot B_z \cdot Nb_a Ta_b O_6.$$

Both of these modifications produce compositions meeting the requirements for capacitors in the range of mole fractions wherein x is from 0.15 to 0.65, y is from 0.001 to 0.85 and z is from 0.001 to 0.55.

In accordance with an important aspect of this invention, the dielectric materials are heated in a cycle which produces a mixture of phases, primarily rhombohedral and tetragonal phase crystalline material. I have found that good dielectric properties are obtained in compositions which have a combination of rhombohedral and tetragonal phase material. One way of obtaining this combination is heating the composition to the sintering point and thereafter cooling the composition in a long cooling period of at least twenty-four hours.

In accordance with other aspects of the invention, CuO is added to the composition to improve the life test characteristics and $MgZrO_3$ is added to the composition to improve the hot insulation resistance.

The foregoing and other objects, features and advantages of the invention will be better understood from the following more detailed description and appended claims.

DESCRIPTION OF THE DRAWINGS

FIG. 3 depicts a slow sintering cycle;

FIG. 4 depicts the range of mole fractions of unmodified ternary lead niobates suitable for use in capacitors;

FIG. 5 depicts the range of mole fractions of modified ternary lead niobates suitable for use in capacitors.

DESCRIPTION OF THE PREFERRED EMBODIMENT

Figure 1:
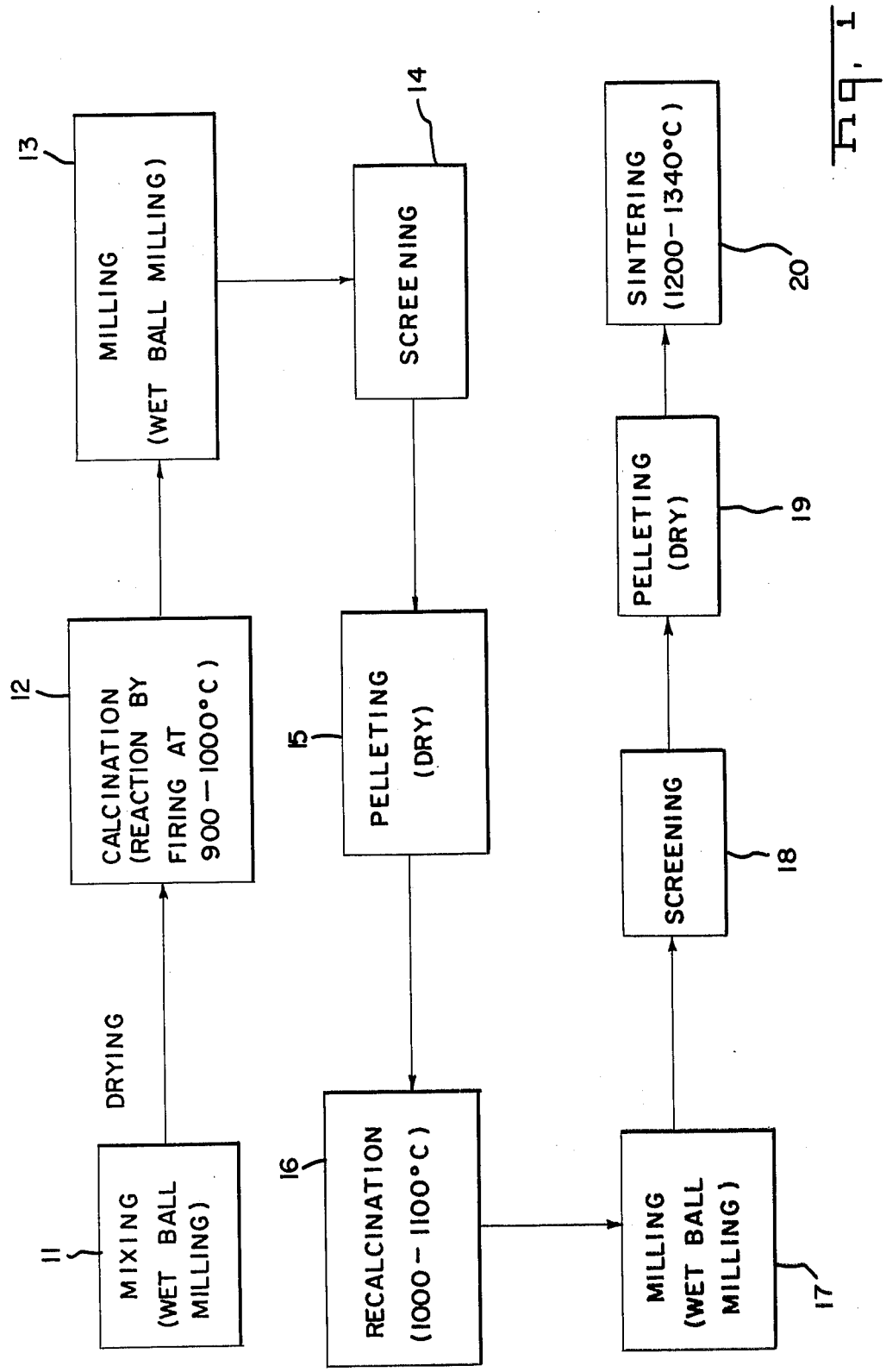
FIG. 1 is a flow sheet depicting the process of making dielectric material for use in test disk capacitors in accordance with this invention.

A process of making dielectric material for test disk capacitors is shown in FIG. 1. The making of production capacitors is in accordance with the McBrayer and Rutt U.S. Pat. Nos. 3,604,082 and 3,788,867 respectively.

Figure 2:
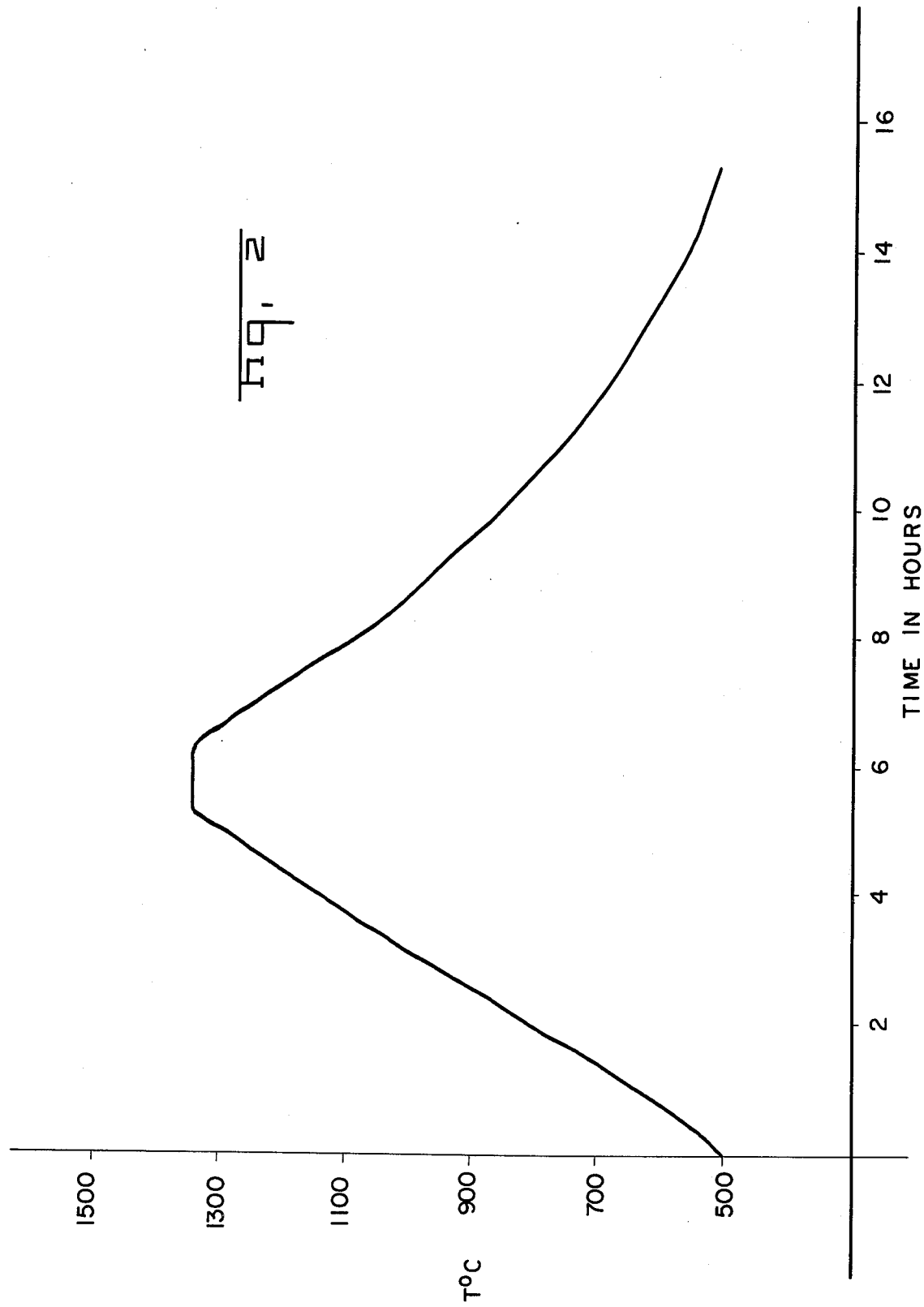
FIG. 2 depicts a standard sintering cycle.
Figure 7:
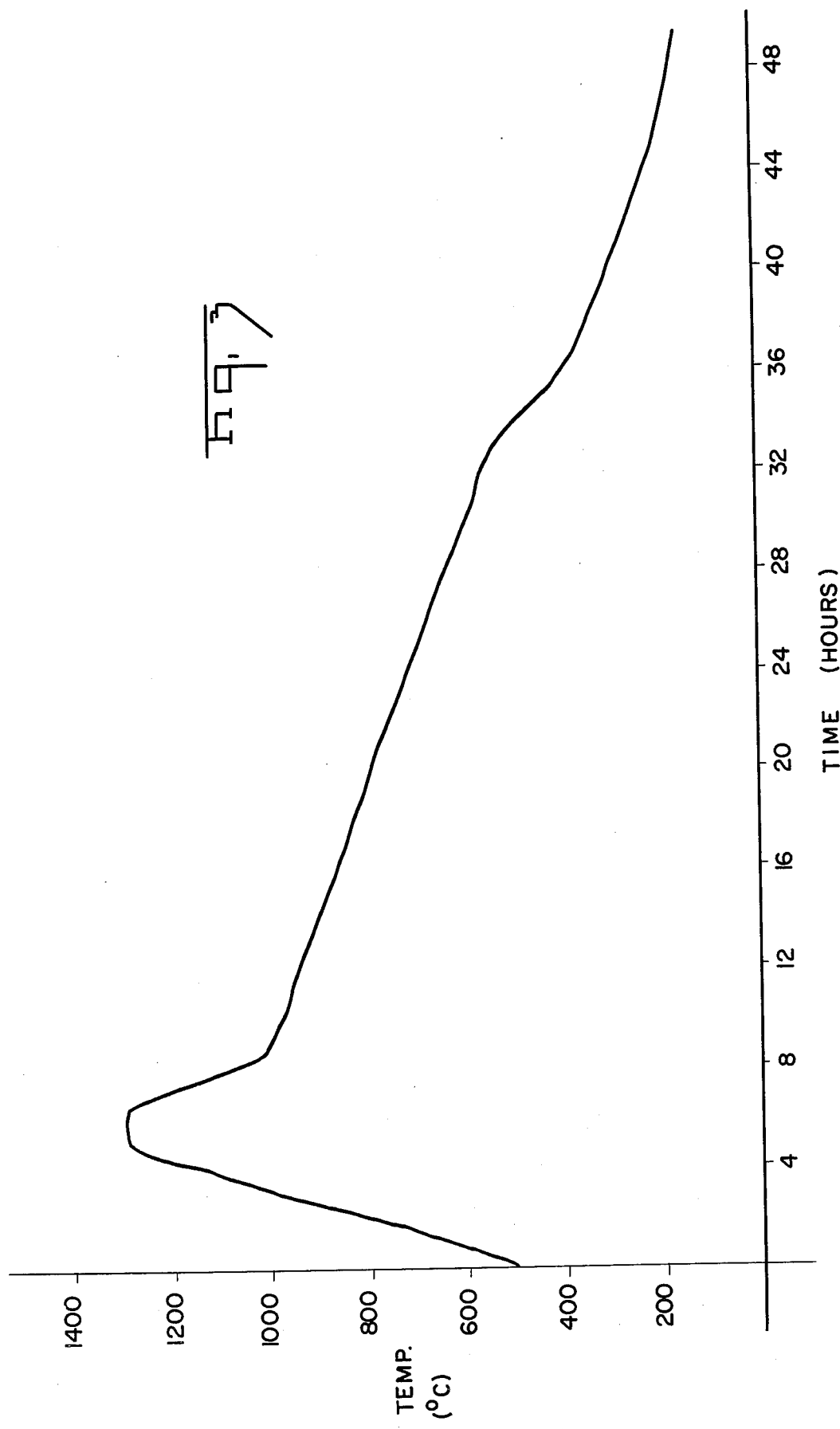

Batch materials are mixed by wet ball milling as depicted at 11. Oxides, carbonates, oxalates or hydroxides of the elements may be used as batch materials. The material is dried and calcined as indicated at 12. The calcined material is milled as indicated at 13, dried, and passed through a mesh screen as indicated at 14. The materials are pressed into large pellets as indicated at 15 and recalcined as indicated at 16. Calcined pellets are broken up by milling as indicated at 17, dried and screened as indicated at 18. The material is pressed into pellets as indicated at 19 and sintered as indicated at 20. The sintering temperature is normally in the range of 1200° C.–1340° C. for these materials. A standard sintering schedule in which the material is sintered for one hour at a temperature of 1340° C. is depicted in FIG. 2. A slower sintering schedule sometimes useful in producing capacitor grade compositions is depicted in FIG. 3.

The slower sintering schedule is quite useful in bringing ternary niobate compositions into the range of temperature characteristics for BX or X7R grade capacitors. In order to get dielectric properties which meet these specifications, a composition must have a combination of phases. If the material is cooled too quickly after sintering, material may exist only in the tetragonal phase. I have found that cooling in the slower sintering schedule of FIG. 3 produces a mixture of phases with good dielectric properties. Other heating schedules may be used to produce compositions having a combination of rhombohedral and tetragonal crystalline phases which are useful for X7R grade capacitors.

Ternary niobate compositions thus produced may be used in the production of capacitors as described in the aforementioned patents. As more fully described in those patents, the material is formed into thin dielectric sheets. A film of conductive material is applied to the sheets in predetermined positions. The dielectric sheets are stacked to form a capacitor and leads are connected thereto.

FIG. 4 depicts the range of mole fractions of unmodified ternary niobates which are suitable for use in X7R grade capacitors. FIG. 4 is a ternary mole fraction diagram in which the mole fraction 1.0 $PbNb_2O_6$ is the top corner of the diagram, the mole fraction 1.0 $BaNb_2O_6$ is at the lower left hand corner and the mole fraction 1.0 $SrNb_2O_6$ is the lower right hand corner. In this diagram, the mole fractions of $PbNb_2O_6$, $BaNb_2O_6$, and $SrNb_2O_6$ in the range enclosed by the solid line designated 18 meet the requirements for X7R grade capacitors. The ternary system $Pb_xBa_ySr_zNb_2O_6$ in the specified range of mole fractions in which $x=0.1$ to 0.4, $y=0.1$ to 0.4, and $z=0.4$ to 0.5 are are suitable for use.

Modifications of the basic ternary system which produce capacitor grade compositions over a wider range of mole fractions of the ternary elements include partial substitution of $Ta_2O_5$ for $Nb_2O_6$. FIG. 5 depicts the range of mole fractions of ternary niobates modified in this manner which are suitable for use in X7R grade capacitors. The ranges are broader than those of the unmodified ternary lead niobates. The ranges in mole fractions are $PbNb_2O_6$ from 0.15 to 0.65 $BaNb_2O_6$ from 0.001 to 0.85, and $SrNb_2O_6$ from 0.001 to 0.55.

In compositions modified in this manner, calcium and/or cadmium may be completely substituted for Ba or Sr. Ca may be substituted to a total of about 20 mole percent and Cd up to about 10 mole percent. The substitution of cadmium in compositions of this type is described in Subbarao and Shirane, J. of Chem. Phys. 32, 1960, p. 1846.

Figure 6:
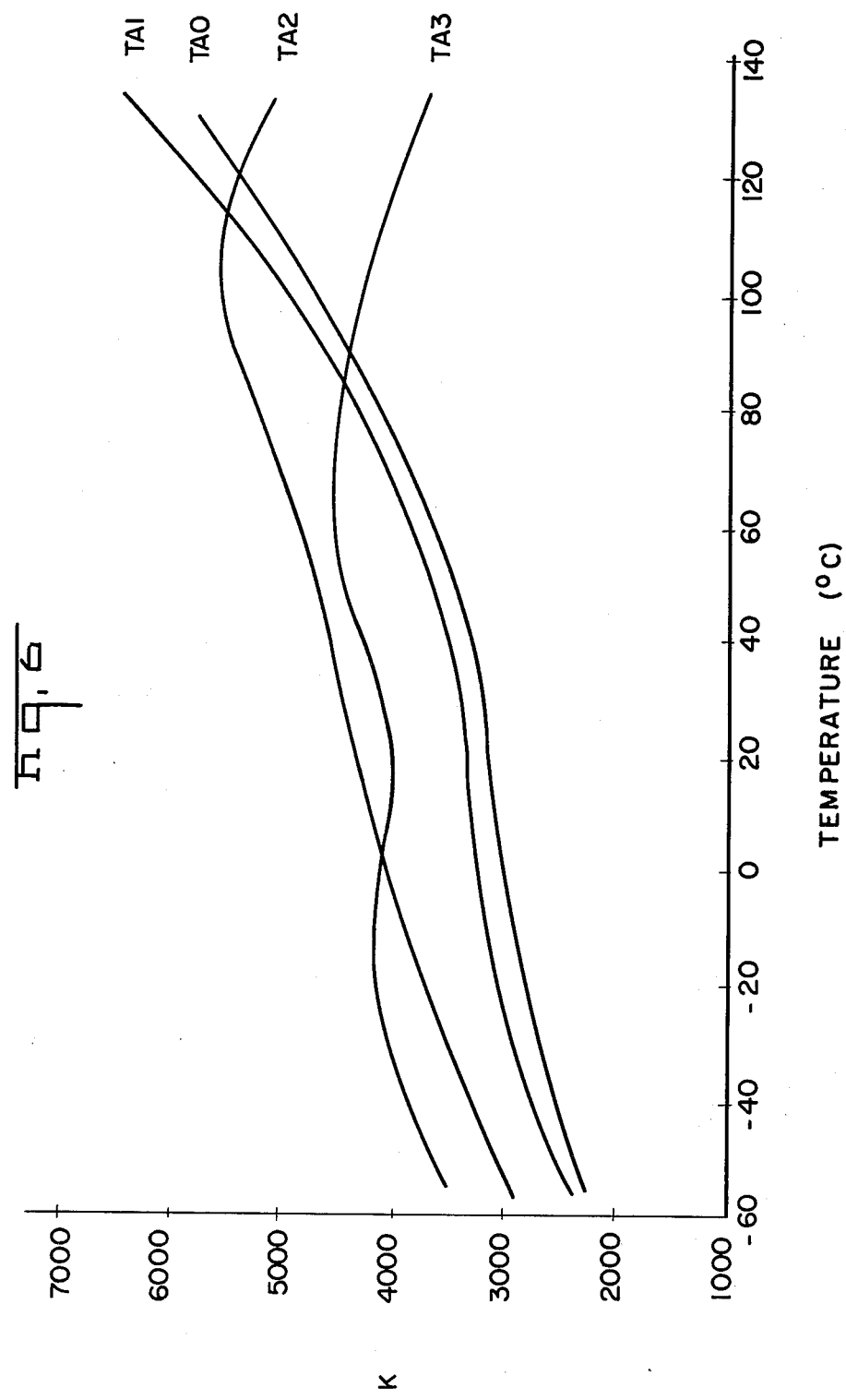
FIG. 6 shows the effect of $Ta_2O_5$ substitution on $(Pb_{0.5}Ba_{0.1}Sr_{0.4}) Nb_2O_6$.

The fired ternary niobate composition thus produced has the approximate formula:

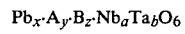

$$Pb_x \cdot A_y \cdot B_z \cdot Nb_a Ta_b O_6$$

where A and B are different from one another, A is selected from the group consisting of Ba, Ca and Cd, B is selected from the group consisting of Sr, Ca and Cd, x, y and z represent the mole fractions of each of Pb, A and B in said composition, the sum of x, y and z being one, and a and b are the mole fractions of Nb and Ta, the sum of a and b being 2. The substitution of $Ta_2O_5$ produces a flattening of and a decrease in the temperature of the peak dielectric constant in all compositions. Usually accompanying this is the development of a second peak at a lower temperature. This effect is shown graphically in FIG. 6 which depicts the effect of the substitution of $Ta_2O_6$ on $(Pb_{0.5} Ba_{0.1} Sr_{0.4})Nb_2O_6$. The numbers following TA on the drawing represent different percentages of $Ta_2O_5$ (0=0, 1=5, 2=10 and 3=15). The data in FIG. 6 can be compared with that reported by Mikhailov & Rotenberg, Izv Akad Nauk USSR, Ser. Fiz 24, 1282, 1960 which show similar results although much lower dielectric constants.

Another modification which produces capacitor grade dielectric material over the wider range is the addition of one of the rare earth oxides. $La_2O_5$, $Nd_2O_3$ or $Ce_2O_3$ may be added. The addition of $La_2O_5$ is preferable. I have found that a mixture of from 97.0 to 99.95 mole percent of $Pb_x \cdot Ba_y \cdot Sr_z (Nb_2O_6)$ and from 0.05 to 3.00 mole percent of the rare earth oxides produces dielectric material suitable for use as X7R grade capacitors.

Another common specification for capacitors calls for a minimum value of hot insulation resistance. Typically X7R grade capacitors must have an insulation resistance greater than 100 K megohms at a temperature of 25° C. or 1000 megohm-microfarads whichever is less.

I have observed an unexpected improvement in insulation resistance with the addition of 0.005–1.0% $MgZrO_3$.

Most specifications for capacitors call for a life test in which voltage is applied at elevated temperatures. It has been found that the addition of CuO has proved beneficial in insuring that the capacitors produced in accordance with this invention passed this life test. The addition of CuO to ferroelectric glass ceramics is described in U.S. Pat. No. 3,490,887—Herczog and Layton. This patent implies, in column 1, that the addition of CuO is not required for ceramics. However, the ternary niobate ceramics of this invention have a liquid phase during the initial sintering time which is similar to that observed in the glass ceramic of the aforementioned Herczog and Layton patent. This liquid phase produces an extremely dense ceramic. Therefore, the mechanism by which the addition of CuO improves the performance of glass ceramics is applicable to the ceramic of the present invention.

Various materials such as mineralizer or electrical modifiers may be present in my compositions in minor amounts of about 0.005 to about one percent by weight. Typical of such materials are $SiO_2$, $Mn_2O_3$, $Co_2O_3$ and NiO. Other elements which can be substituted in small amounts include $ZrO_2$, $TiO_2$, $SnO_2$, ZnO, and MgO.

The actual formula for a meta niobate, i.e. $PbNb_2O_6$ is used herein rather than specific mole percentages or weight percentages. The ratio of PbO-BaO-SrO (the "A" site ion) to $Nb_2O_5$ can be altered at least up to ±10% and the composition still brought into specification. In general, excess "A" site ions increase K and made it necessary to use the slower schedule. Excess $Nb_2O_5$ usually results in lower K and better temperature characteristics.

EXAMPLES

Example 1

Unmodified ternary $Pb_xBa_ySr_zNb_2O_6$.

Baker reagent grade $BaCO_3$, $SrCO_3$ and PbO and Ciba optical grade $Nb_2O_5$ were used as batch materials. These were mixed by milling approximately 50 gms. lots with 200 c.c. methanol in Nalgene jars charged with 130 gms. of zirconia balls. The material was quantitatively transferred to pyrex dishes and dried at 85° C. in a vented oven. The dried material was packed into platinum boxes or zirconia saggers and calcined at 950° C. for one hour. The calcined material was milled overnight (sixteen hours), dried and passed through a 350 mesh screen. The powders were pressed into two large pellets and recalcined at 1050° C. for two hours. The calcined pellets were broken up and milled for sixteen hours. After drying, the material was screened through a 350 mesh sieve. Eight gram samples were pressed in a 1" die at 4,000 psi.

These samples were sintered in the sintering schedule of FIG. 2 or the sintering schedule of FIG. 3. The samples sintered on the schedule shown in FIG. 3 and having mole fractions of $PbNb_2O_6$, $BaNb_2O_6$ and $SrNb_2O_6$ in the range enclosed by the solid line designated 18 in FIG. 4 met the requirements for X7R grade capacitors. The dielectric constant K, and the maximum positive and negative percentage change in permitivity from 25° C. over the range −55° C. to 125° C. are shown below:

| Composition | K | Max. % Change In Permitivity from 25° C. | |
|---|---|---|---|
| $Pb_{.2}Ba_{.4}Sr_{.4}Nb_2O_6$ | (a) 3273 | −21 | +12 |
| | (b) 2214 | −4 | +14 |
| $Pb_{.3}Ba_{.3}Sr_{.4}Nb_2O_6$ | (a) 5021 | −21 | +8 |
| | (b) 2422 | −11 | +11 |
| $Pb_{.4}Ba_{.2}Sr_{.4}Nb_2O_6$ | (a) 5460 | −19 | +7 |
| | (b) 3094 | −8 | +10 |
| $Pb_{.1}Ba_{.4}Sr_{.5}NB_2O_6$ | (a) 3750 | −31 | +10 |
| | (b) 2235 | −15 | +8 |
| $Pb_{.2}Ba_{.3}Sr_{.5}Nb_2O_6$ | (a) 3430 | −30 | +7 |
| | (b) 2279 | −14 | +6 |
| $Pb_{.3}Ba_{.2}Sr_{.5}Nb_2O_6$ | (a) 5102 | −26 | +6 |
| | (b) 3047 | −15 | +6 |
| $Pb_{.4}Ba_{.1}Sr_{.5}Nb_2O_6$ | (a) 6035 | −30 | +9 |
| | (b) 2783 | −14 | +9 |
| $Pb_{.3}Ba_{.1}Sr_{.6}Nb_2O_6$** | — | | |
| | (b) 1140 | −13 | +9 |
| $Pb_{.3}Ba_{.4}Sr_{.3}Nb_2O_6$** | (a) 4870 | −24 | +34 |
| | (b) 2814 | −6 | +37 |

(a) Denotes compositions sintered on schedule of FIG. 2;
(b) sintered on schedule of FIG. 3.
**Denotes compositions outside the mole fraction range of this invention.

The results above provide a good demonstration of how the slower sintering schedule brings the compositions of this invention within the specifications for X7R capacitors.

Example 2

The ternary composition modified by the substitution of $Ta_2O_5$.

The material was prepared in the manner described in Example 1 without substitution and with substitution of $Ta_2O_5$ in the amounts shown in the table below. The dielectric constant and temperature characteristics of the materials thus produced are shown in the table below:

| Composition | K | Max. % Change In Permitivity From 25° C. Value | | % Of $Nb_2O_5$ Substituted By $Ta_2O_5$ | K | Max. % Change In Permitivity From 25° C. | |
|---|---|---|---|---|---|---|---|
| $Pb_{.33}Ba_{.33}Sr_{.33}Nb_2O_6$ | 3600 | −20 | +5 | 5 | 4461 | +5 | −14 |
| $Pb_{.4}Ba_{.61}Sr_{.2}Nb_2O_6$ | 4530 | −22 | +102 | 15 | 3868 | +8 | −13 |
| $Pb_{.2}Ba_{.4}Sr_{.61}Nb_2O_6$ | 3273 | −21 | +12 | 2 | 2099 | +6 | −15 |
| $Pb_{.4}Ba_{.1}Sr_{.5}Nb_2O_6$ | 6035 | −30 | +9 | 5 | 4200 | +0 | −15 |
| $Pb_{.5}Ba_{.1}Sr_{.4}Nb_2O_6$ | 3160 | −28 | +80 | 15 | 4050 | +0 | −11 |
| $Pb_{.6}Ba_{.1}Sr_{.3}Nb_2O_6$ | 2970 | −26 | +52 | 35 | 2651 | −18 | −15 |
| $Pb_{.6}Ba_{.3}Sr_{.1}Nb_2O_6$ | 2265 | −23 | +54 | 30 | 4285 | +6 | −15 |
| | | | | | *2912 | +6 | −15 |
| $Pb_{.5}Ba_{.4}Sr_{.1}Nb_2O_6$ | 4250 | −20 | +36 | 15 | 4421 | +3 | −15 |
| | | | | | *2681 | −9 | −9 |
| $Pb_{.4}Ba_{.5}Sr_{.1}Nb_2O_6$ | 4230 | −15 | +40 | 15 | 3438 | +7 | −15 |
| | | | | | *2229 | +11 | −10 |
| $Pb_{.1}Ba_{.6}Sr_{.3}Nb_2O_6$** | 2200 | −21 | +42 | 5 | 1352 | +36 | −36 |
| $Pb_{.7}Ba_{.2}Sr_{.1}Nb_2O_6$** | 1500 | −18 | +47 | 40 | 1107 | +39 | −18 |

*Sintered on schedule of FIG. 3; otherwise the sintering is on the schedule of FIG. 2.
**Composition is outside the mole fraction range of this invention.

Example 3

The ternary composition with the addition of the rare earth oxide $La_2O_3$.

The material was prepared in the manner described in Example 1. The dielectric constant and temperature characteristics of the materials thus produced are shown in the table below:

| Composition | Mol % $La_2O_3$ Added | K | Max. % Change In Permitivity From 25° C. Value | |
|---|---|---|---|---|
| $Pb_{.33}Ba_{.33}Sr_{.33}Nb_2O_6$ | 0.25 | 3154 | −13 | +5 |
| $Pb_{.4}Ba_{.4}Sr_{.2}Nb_2O_6$ | 1.38 | *2916 | −15 | +4 |
| $Pb_{.4}Ba_{.1}Sr_{.5}Nb_2O_6$ | 0.25 | 3297 | −14 | +0 |
| $Pb_{.5}Ba_{.1}Sr_{.4}Nb_2O_6$ | 1.30 | *2604 | −15 | +2 |
| $Pb_{.6}Ba_{.1}Sr_{.3}Nb_2O_6$ | 3.00 | *2206 | −15 | +6 |
| $Pb_{.6}Ba_{.3}Sr_{.1}Nb_2O_6$ | 2.98 | *2548 | −6 | +7 |
| $Pb_{.5}Ba_{.4}Sr_{.1}Nb_2O_6$ | 1.5 | 3627 | −15 | +9 |

-continued

| Composition | Mol % La$_2$O$_3$ Added | K | Max. % Change In Permitivity From 25° C. Value | |
|---|---|---|---|---|
| Pb$_{.4}$Ba$_{.5}$Sr$_{.1}$Nb$_2$O$_6$ | 1.80 | *2317 | −15 | +3 |

*Sintered in schedule of FIG. 3: otherwise the sintering is on the schedule of FIG. 2.

All compositions within the broader range of mole fractions met the requirements for X7R grade capacitors but slower sintering schedule was required to bring some compositions within range.

Example 4

The ternary composition with the addition of the rare earth oxide Nd$_2$O$_3$.

The material was prepared in the manner described in Example 1.

| | K | Max. % Change In Permitivity | |
|---|---|---|---|
| Pb$_{.5}$Ba$_{.4}$Sr$_{.1}$Nb$_2$O$_6$ + 1.5 mol % Nd$_2$O$_3$ | 3529 | −15 | +3 |

Example 5

Compositions formed into both disk and multilayer capacitors

The following compositions were formed into disk capacitors prepared in the manner described in Example 1, into multilayer capacitors with paladium electrodes prepared in the manner taught by McBrayer et al U.S. Pat. No. 3,604,082 and into multilayer capacitors with lead tin impregnated electrodes prepared in accordance with the teachings of the Rutt patents. Composition Pb$_{0.5}$Ba$_{0.4}$Sr$_{0.1}$Nb$_{1.7}$Ta$_{0.3}$O$_6$

| | K | Maximun % Change In Permitivity From 25° C. | |
|---|---|---|---|
| | | −55° | +125° C. |
| Disk - Ag electrodes | 4421 | +3 | −13 |
| Multilayer - -Pd electrodes | 4104 | +6 | −12 |
| Multilayer - Pb-Sn impregnated | 4253 | +5 | −14 |
| Composition Pb$_{.4}$Sr$_{.5}$Ba$_{.1}$Nb$_2$O$_6$ (+ minor additives) | | | |
| Disk | 3297 | −15 | +0 |
| Multilayer Pd electrodes | 3691 | −12 | +0 |

Example 6

Modified compositions with a calcium substitution

The compositions were prepared in the manner described in Example 1.

| | | | |
|---|---|---|---|
| Pb$_{.5}$Ba$_{.3}$Sr$_{.1}$Ca$_{.1}$Nb$_2$O$_6$ + 1.5 mole % La$_2$O$_3$ | 3140 | +1 | −15 |
| Pb$_{.6}$Ba$_{.2}$Ca$_{.2}$Nb$_{1.5}$Ta$_{.5}$O$_6$ | 3020 | +2 | −15 |

Example 7

Compositions with CuO and Mn$_2$O$_3$ added to improve life tests

Multilayer capacitors with Pd electrodes were formed in accordance with McBrayer et al U.S. Pat. No. 3,604,082. A standard life test was performed on these capacitors. This included application of 100 V. which is double the rated voltage, 50 volts in this example, and maintenance of this voltage at 125° C. for 1,000 hours.

| | |
|---|---|
| Essentially Pb$_{.4}$Sr$_{.5}$Ba$_{.1}$Nb$_2$O$_6$ + 0.15% CuO | 0/8 failure. |
| Essentially Pb$_{.4}$Sr$_{.5}$Ba$_{.1}$Nb$_2$O$_6$ + 0.15% CuO + Mn$_2$O$_3$ | 0/8 failure. |
| Essentially Pb$_{.4}$Sr$_{.5}$Ba$_{.1}$Nb$_2$O$_6$ with no additives | 7/8 failure. |

Example 8

Compositions with MgZrO$_3$ added to improve insulation resistance.

The following compositions were formed into 100,000 pf capacitors using the teachings of the aforementioned McBrayer patent. The insulation resistance was measured with an applied voltage of 100 V.

| Basic composition | 25° | 125° C. |
|---|---|---|
| Pb$_{.5}$Ba$_{.4}$Sr$_{.1}$Nb$_2$O$_6$ + 1.5 mol % La$_2$O$_3$ | 1 × 10$^9$Ω | 3 × 10$^8$Ω |
| + 0.1% Mn$_2$O$_3$ | 5 × 10$^{10}$Ω | 1 × 10$^{10}$Ω |
| + 0.5% MgZrO$_3$ | 7 × 10$^{10}$Ω | 1 × 10$^{10}$Ω |
| + both (.1 Mn$_2$O$_3$ + .5 MgZrO$_3$) | 2 × 10$^{11}$Ω | 2 × 10$^{10}$Ω |

While a particular embodiment of the invention has been shown and described, various modifications are within the true spirit and scope of the invention. The appended claims are intended to cover all such modifications.

What is claimed:

1. A dielectric material consisting essentially of a fired ternary niobate composition having an approximate formula:

$$Pb_x \cdot Ba_y \cdot Sr_z(Nb_2O_6)$$

where x, y and z represent the mole fractions of each of Pb, Ba and Sr in said composition, the sum of x, y and z being 1,
x is from 0.1 to 0.4
y is from 0.1 to 0.4 and
z is from 0.4 to 0.5.

2. The material recited in claim 1 which has been heated in a cycle which produces a mixture of phases including rhombohedral and tetragonal phase crystalline material.

3. The material recited in claim 2 wherein said composition is sintered in a cycle in which the temperature is increased to the sintering point in forty eight hours and thereafter cooled to room temperature throughout at least twenty-four hours.

4. A capacitor made of the dielectric material recited in claim 1 and having a dielectric constant of at least 2000.

5. The capacitor recited in claim 4 which has a change in dielectric constant with temperature which is +15% or less over the range from −55° C. to +125° C.

6. The material recited in claim 1 wherein MgZrO$_3$ is added to said composition in an amount from 0.005 to 1.0% by weight of said composition to improve the hot insulation resistance of said composition.

7. The material recited in claim 1 further consisting of CuO added to said composition in an amount sufficient to improve the life test characteristics of said fired composition.

8. The method of making a dielectric material comprising:

mixing compounds of Pb, Ba, Sr and Nb and heating the mixture in a cycle which produces a mixture including rhombohedral and tetragonal phase crystalline material, said compounds being mixed in proportions which produce the fired ternary niobate composition $Pb_x \cdot Ba_y \cdot Sr_z(Nb_2O_6)$ where:

x is from 0.1 to 0.4 y is from 0.1 to 0.4 z is from 0.4 to 0.5 and the sum of x, y and z is one.

9. The method recited in claim 8 wherein the step of heating said mixture in a cycle includes increasing the temperature to the sintering point in four-eight hours and thereafter cooling to room temperature throughout at least twenty-four hours to form a fired ternary niobate composition.

10. The method recited in claim 8 further comprising:

forming a plurality of thin dielectric sheets of said material;

applying a film of conductive material to at least two of said dielectric sheets in predetermined positions; and disposing said dielectric sheets with said films applied thereto in a stack to form a capacitor having a dielectric constant of at least 2000 and a change in dielectric constant with temperature which is 15% or less over the range from $-55°$ C. to $+125°$ C.

11. The method recited in claim 8 further comprising:

adding $MgZrO_3$ to said compounds to improve the insulation resistance of the resulting fired ternary niobate composition.

12. The method recited in claim 11 wherein $MgZrO_3$ in the amount of 0.005-1.0% of the weight of said composition is added to said composition.

13. The method recited in claim 8 further comprising the step of adding CuO to said compounds to improve the life test characteristics of said fired ternary niobate composition.

14. A dielectric material consisting essentially of a fired ternary niobate composition having an approximate formula:

$Pb_x \cdot A_y \cdot B_z \cdot Nb_a Ta_b O_6$ x is from 0.15 to 0.65 y is from 0.001 to 0.85 z is from 0.001 to 0.55 where A and B are different from one another, A is selected from the group consisting of Ba, Ca and Cd, B is selected from the group consisting of Sr, Ca and Cd, x, y and z represent the mole fractions of each of Pb, A, and B in said composition, the sum of x, y and z being one, and a and b are the mole fractions of Nb and Ta, a and b being finite and the sum of a and b being 2.

15. The material recited in claim 14 wherein said composition is 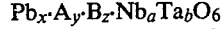 $Pb_x \cdot Ba_y \cdot Sr_z \cdot Nb_a Ta_b O_6$.

16. The material recited in claim 15 wherein an element from the group Ca and Cd is substituted for Ba or Sr in amounts up to a total of approximately 20 mole percent Ca and 10 mole percent Cd.

17. The material recited in claim 14 wherein $Ta_2O_5$ is substituted for $Nb_2O_5$ in the range of from 0.05% to 35% by mole of $Nb_2O_5$.

18. A capacitor made of the dielectric material recited in claim 14 and having a dielectric constant of at least 2000 and a change in dielectric constant with temperature which is 15% or less over the range from 55° C. to $+125°$ C.

19. The material recited in claim 14 wherein $MgZrO_3$ is added to said composition in an amount from 0.005 to 1.0% by weight of said composition to improve the hot insulation resistance of said composition.

20. The dielectric material recited in claim 14 further consisting of CuO in an amount sufficient to improve the life test characteristics of said fired composition.

21. A dielectric material consisting essentially of a fired mixture of:

$Pb_x \cdot Ba_y \cdot Sr_z(Nb_2O_6)$ and a rare earth oxide selected from the group $Nd_2O_3$, $Ce_2O_3$ and $La_2O_3$, wherein said composition is a mixture of from 97.0 to 99.75 mole percent of $Pb_x \cdot Ba_y \cdot Sr_z \cdot (Nb_2O_6)$ and from 0.05 and to 3.00 mole percent of said rare earth oxide, where x, y and z represent the mole fractions of each of Pb, Ba and Sr in said composition, where x is from 0.15 to 0.65, y is from 0.001 to 0.85;

z is from 0.001 to 0.55, and where the sum of x, y and z is one.

22. The material recited in claim 21 wherein an element from the group Ca and Cd is substituted for Ba or Sr in amounts up to a total of approximately 20 mole percent Ca and 10 mole percent Cd.

23. The material recited in claim 21 which has been heat treated in a cycle which produces a mixture of phases including rhombohedral and tetragonal phase crystalline material.

24. The material recited in claim 23 wherein said cycle includes increasing the temperature to the sintering point in four-eight hours and thereafter cooling to room temperature throughout at least twenty-four hours.

25. The material recited in claim 21 wherein said composition is a mixture of:

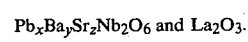 $Pb_x Ba_y Sr_z Nb_2O_6$ and $La_2O_3$.

26. A capacitor made of the dielectric material recited in claim 21 and having a dielectric constant of at least 2000 and a change in dielectric constant with temperature which is 15% or less over the range from $-55°$ C. to $+125°$ C.

27. The material recited in claim 21 wherein $MgZrO_3$ is added to said composition in an amount from 0.005 to 1.0% by weight of said composition to improve the hot insulation resistance of said composition.

28. The material recited in claim 21 further consisting of CuO in an amount sufficient to improve the life test characteristics of said fired mixture.

* * * * *